United States Patent
Arunkumar et al.

(12) 
(10) Patent No.: US 10,237,178 B2
(45) Date of Patent: Mar. 19, 2019

(54) MAPPING PACKET IDENTIFIERS OF RECEIVED CONTENT TO A CONSTANT VALUE

(71) Applicant: ARRIS Enterprises LLC, Suwanee, GA (US)

(72) Inventors: Lakshmi Arunkumar, Bangalore (IN); Manu Shrot, Bangalore (IN); Murali S. Sahasranaman, Bangalore (IN); Krishna Prasad Panje, Bangalore (IN); Virendra Singh, Bangalore (IN)

(73) Assignee: ARRIS Enterprises LLC, Suwanee, GA (US)

(*) Notice: Subject to any disclaimer, the term of this patent is extended or adjusted under 35 U.S.C. 154(b) by 388 days.

(21) Appl. No.: 15/092,072

(22) Filed: Apr. 6, 2016

(65) Prior Publication Data
US 2017/0295095 A1    Oct. 12, 2017

(51) Int. Cl.
*G06F 13/00* (2006.01)
*H04L 12/741* (2013.01)
*H04L 29/06* (2006.01)

(52) U.S. Cl.
CPC .......... *H04L 45/74* (2013.01); *H04L 65/4069* (2013.01)

(58) Field of Classification Search
CPC ............................ H04L 65/4069; H04L 45/74
USPC ................... 709/231, 220–222, 245
See application file for complete search history.

(56) References Cited

U.S. PATENT DOCUMENTS

2008/0205309 A1* 8/2008 Laaksonen ............ H04W 80/00
                                                                    370/310
2011/0289322 A1* 11/2011 Rasti ................... H04L 63/0421
                                                                    713/182

* cited by examiner

*Primary Examiner* — Kenneth R Coulter
(74) *Attorney, Agent, or Firm* — Bart A. Perkins

(57) ABSTRACT

Methods, systems, and computer readable media can be operable to facilitate the mapping of packet identifiers to a constant value. A multimedia device may receive one or more pieces of multimedia content and may select a constant PID value for each of one or more component streams associated with the content. The multimedia device may map PIDs of each respective one of the one or more component streams to a constant PID value designated for the component type of the respective component stream. The multimedia device may replace the PIDs of each component stream with constant PID values such that each component stream type includes the same PID value for the entirety of the stream. The modified component streams, each having continuity with respect to PID values, may be stored as a recording or output to a device for viewing.

20 Claims, 4 Drawing Sheets

MAPPING PACKET IDENTIFIERS OF RECEIVED CONTENT TO A CONSTANT VALUE

TECHNICAL FIELD

This disclosure relates to the mapping of packet identifiers associated with received content to a constant value.

BACKGROUND

A customer premise equipment (CPE) device such as a gateway device or set-top box (STB) is typically provided by a multiple-system operator (MSO) to a subscriber so that the subscriber may receive multimedia services offered by the MSO. The CPE device can be used by the subscriber to access a variety of multimedia services, including but not limited to live or linear television, digital video recorder (DVR) content, video-on-demand (VoD) content, over-the-top (OTT) content, and others.

Generally, in order to provide services to a subscriber, the CPE device will receive and decode transmitted content for recording, display to a viewer, or streaming to a client device. In order to identify and decode a particular piece of content requested by a subscriber, the CPE device will typically acquire a channel associated with the content, acquire program map table (PMT) information from a transport stream carried over the acquired channel, and identify component or elementary streams (e.g., video, audio, data, etc.) for decoding based on packet identifiers (PIDs) associated with the component or elementary streams. Once PIDs associated with the relevant component or elementary streams are known, the CPE device may configure one or more device components (e.g., decoders, filters, etc.) to process the streams associated with the PIDs.

The process of configuring a CPE device and associated components with component stream PIDs can be time consuming, and generally, the components of the CPE device are reconfigured each time component streams having different PIDs are to be processed. For example, a channel or tuner change, a transition at a segment boundary within stitched content, or any other PID discontinuity that is detected within a stream may cause the CPE device to reacquire PMT information and/or reconfigure device components to process the new PID(s). The reacquisition of PMT information and/or reconfiguration of device components with new PIDs can cause delays in channel changes, initiation of content playback, and a loss of content at segment boundaries within stitched content. Therefore, it is desirable to improve upon methods and systems for processing content streams exhibiting discontinuities.

BRIEF DESCRIPTION OF THE DRAWINGS

Like reference numbers and designations in the various drawings indicate like elements.

DETAILED DESCRIPTION

Figure 1:
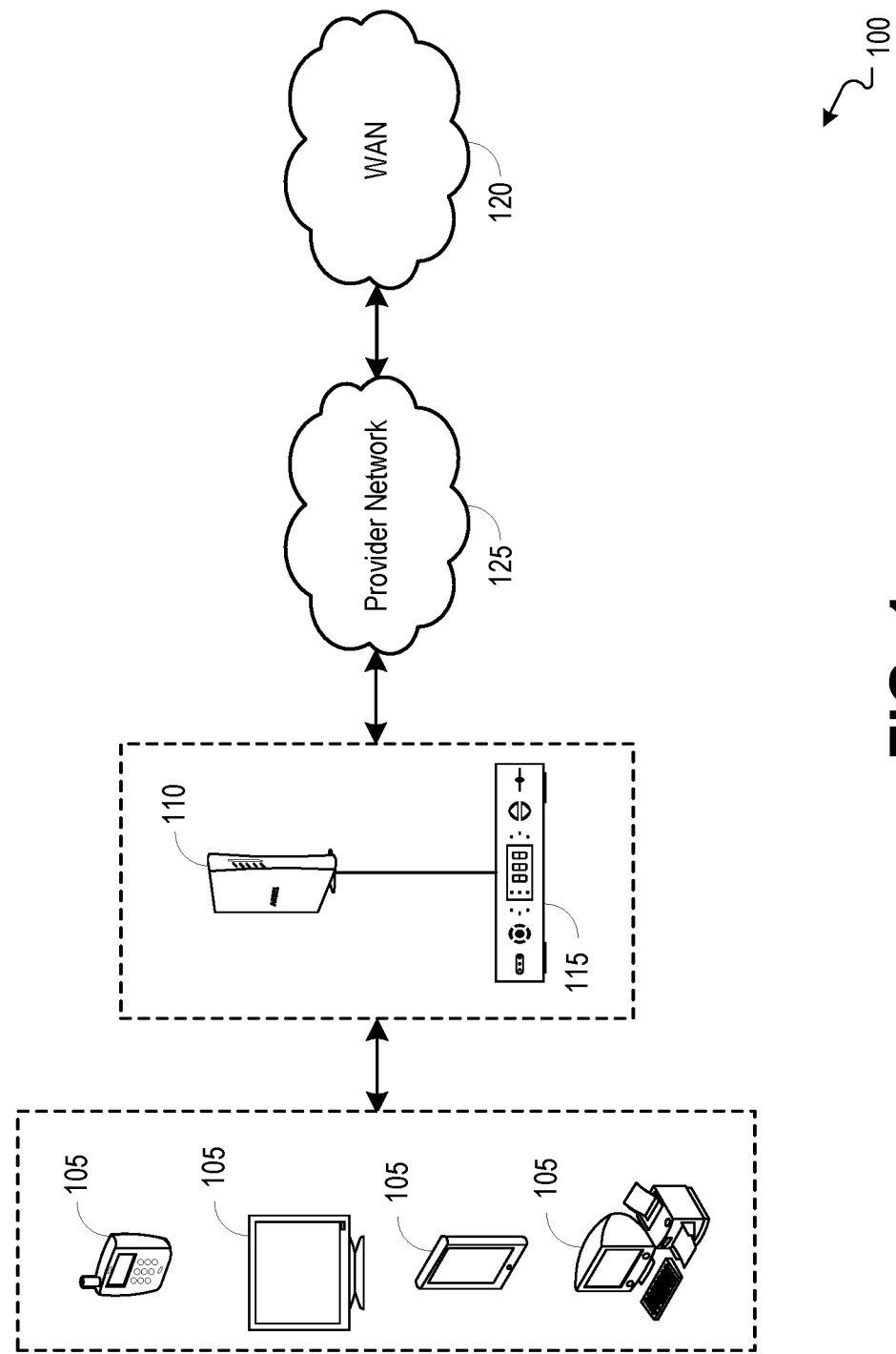
FIG. 1 is a block diagram illustrating an example network environment operable to facilitate the mapping of packet identifiers to a constant value.

It is desirable to improve upon methods and systems for processing different content streams at a device. Methods, systems, and computer readable media can be operable to facilitate the mapping of packet identifiers to a constant value. A multimedia device may receive one or more pieces of multimedia content and may select a constant PID value for each of one or more component streams associated with the content. The multimedia device may map PIDs of each respective one of the one or more component streams to a constant PID value designated for the component type of the respective component stream. The multimedia device may replace the PIDs of each component stream with constant PID values such that each component stream type includes the same PID value for the entirety of the stream. The modified component streams, each having continuity with respect to PID values, may be stored as a recording or output to a device for viewing.

An embodiment of the invention described herein may include a method comprising: (a) receiving a transport stream carrying one or more component streams associated with a piece of content, wherein each respective one of the one or more component streams comprises an original packet identifier; (b) determining a constant packet identifier value for each respective one of one or more component stream types; (c) for each respective one of the one or more component streams, identifying a component stream type associated with the respective component stream; (d) for each respective one of the one or more component streams, creating a modified component stream by replacing the original packet identifier with the constant packet identifier value determined for the component stream type associated with the respective component stream; and (e) outputting the one or more modified component streams.

According to an embodiment of the invention, one or more of the component streams associated with the piece of content comprises a plurality of segments, wherein the original packet identifiers of each of the plurality of segments are not the same.

According to an embodiment of the invention, the method described herein further comprises configuring one or more audio and video processors with the constant packet identifier values determined for each of the one or more component stream types.

According to an embodiment of the invention, outputting the one or more modified component streams comprises outputting the one or more modified component streams to storage as a recording.

According to an embodiment of the invention, outputting the one or more modified component streams comprises streaming the one or more modified component streams to a client device.

According to an embodiment of the invention, outputting the one or more modified component streams comprises processing the one or more modified component streams for output to a display device.

According to an embodiment of the invention, determining a constant packet identifier value for each respective one of one or more component stream types comprises selecting an unused value from a range of user ancillary packet identifier values.

An embodiment of the invention described herein may include an apparatus comprising: (a) an interface configured to be used to receive a transport stream carrying one or more component streams associated with a piece of content, wherein each respective one of the one or more component streams comprises an original packet identifier; and (b) one or more modules configured to: (i) determine a constant packet identifier value for each respective one of one or more component stream types; (ii) identify, for each respective one of the one or more component streams, a component stream type associated with the respective component stream; (iii) create, for each respective one of the one or more component streams, a modified component stream by replacing the original packet identifier with the constant packet identifier value determined for the component stream type associated with the respective component stream; and (iv) output the one or more modified component streams.

An embodiment of the invention described herein may include one or more non-transitory computer readable media having instructions operable to cause one or more processors to perform the operations comprising: (a) receiving a transport stream carrying one or more component streams associated with a piece of content, wherein each respective one of the one or more component streams comprises an original packet identifier; (b) determining a constant packet identifier value for each respective one of one or more component stream types; (c) for each respective one of the one or more component streams, identifying a component stream type associated with the respective component stream; (d) for each respective one of the one or more component streams, creating a modified component stream by replacing the original packet identifier with the constant packet identifier value determined for the component stream type associated with the respective component stream; and (e) outputting the one or more modified component streams.

FIG. 1 is a block diagram illustrating an example network environment 100 operable to facilitate the mapping of packet identifiers to a constant value. In embodiments, video, voice, and/or data services may be delivered to one or more client devices 105. Client devices 105 may include televisions, mobile devices, tablets, computers, set-top boxes (STB), telephones, gaming devices, and any other device operable to receive video, voice, and/or data services. It should be understood that various data, multimedia, and/or voice services may be delivered to the client devices 105, including but not limited to, live or broadcast television, video-on-demand (VoD) content, pay-per view content, recorded content (e.g., DVR content), audio-only content, streaming content, and others.

In embodiments, one or more services delivered to a subscriber premises may be received and forwarded to one or more client devices 105 by an access device 110 and or STB 115. An access device 110 may include a gateway device (e.g., residential gateway, multimedia gateway, etc.), a router, a wireless network extender, or any other device configured to route communications to and from one or more client devices 105. It should be understood that the devices shown in FIG. 1 may be integrated. For example, a client device 105 such as a television may be connected to a STB 115, and a user interface may be received from a STB 115 and displayed to a user through the client device 105.

In embodiments, multiple services (e.g., video, voice, and/or data services) may be delivered from a wide-area network (WAN) 120 to an access device 110 or STB 115 through a connection between the device and a provider network 125. The provider network 125 may include an optical network, hybrid fiber coaxial (HFC) network, digital subscriber line (DSL) network, twisted-pair, mobile network, high-speed data network, MoCA network, and others. Multiple systems operator (MSO) or service provider devices and/or networks within the WAN 120 may be used to provide, manage, and/or troubleshoot the multiple services provided to subscribers. In embodiments, a STB 115 may receive one or more services from an access device 110. For example, Internet protocol television (IPTV) content or any other streaming content may be streamed from the access device 110 to the STB 115 for output to an associated display device (e.g., television).

In embodiments, multiple services may be delivered from an access device 110 or STB 115 to one or more client devices 105 through a local network. The local network may include a local area network (LAN), wireless local area network (WLAN), personal area network (PAN), Multimedia over Coax Alliance (MoCA) network, mobile hotspot network, and others. The local network may be provided at a subscriber premises by the access device 110 or one or more other access points within the premises. It will be appreciated by those skilled in the relevant art that delivery of the multiple services over the local network may be accomplished using a variety of standards and formats.

Multimedia content may be delivered to a client device 105 as a transport stream carried by a channel (e.g., broadcast or linear channel, high-speed data channel, VoD channel, etc.). When the client device 105 is tuned to a certain channel, the client device 105 can identify and decode certain information within the transport stream, the certain information being associated with a piece of content that is of interest to a user. A transport stream may include a plurality of streams including, but not limited to a video stream, audio stream, data stream, and others.

A client device 105 may identify individual packets and/or streams that are to be decoded and output based upon information received from a PMT. A PMT (e.g., PMT of a Moving Picture Experts Group (MPEG) transport stream) may include program information associated with a channel or program such as audio PIDs, video PIDs, program clock reference (PCR) PIDs, data PIDs, metadata associated with the channel or program, and other information. Using program information received from a PMT, a client device 105 may decode information carried by one or more streams within an associated transport stream. For example, a client device 105 may identify an audio and a video stream from within a transport stream, the identified audio and video streams being associated with content that is of interest to a user. The client device 105 may decode packets carried by the audio and video streams to produce an audio/video output of the content, and the audio/video output may be presented to the user.

After a device has acquired information used to identify and decode audio/video information for a piece of content, a condition or event may occur that creates a need for the device to acquire new information for identifying and decoding audio/video information. For example, a need for new or updated PMT information may arise in response to a detection of a PID change. A PID change may occur when a new content stream or piece of content is requested, when a targeted advertisement (TAD) switch occurs, or in response to other events or occurrences.

When an access device 110 or STB 115 receives a transport stream, the device may acquire a PMT associated with the transport stream, and using the PMT, the device may identify one or more PIDs of interest. The PIDs of interest may be PIDs of a video stream, audio stream, data stream, or other elementary streams associated with certain content carried by the transport stream. Once the specific PIDs of interest are identified, the device may filter the PIDs of interest from the transport stream. One or more decoders associated with the device may be programmed to decode the PIDs of interest, and the PIDs of interest, including the content associated with the PIDs of interest, may be decoded and output for storage or presentation at a display device.

In embodiments, an access device 110 or STB 115 may determine a range of PID values from which to select a PID value for use as a constant PID value. The device may determine a range of PID values that does not overlap with PIDs used for the delivery of content to the device. For example, the device may determine a range of PID values that does not overlap with PIDs used by a headend device (e.g., modulator, multiplexer, edge QAM (quadrature amplitude modulation) device, and/or any other headend device that may form and/or manipulate a PMT) for various PIDs including PMT, entitlement control message (ECM), and component PIDs (e.g., video, audio, data, etc.). The access device 110 or STB 115 may identify unique and unused PIDs from a user ancillary PID range (e.g., 0x1C00-0x1FFE) as PID values from which to select a PID value for use as a constant PID value.

In embodiments, an access device 110 or STB 115 may select a constant PID value or a range of constant PID values for each of one or more types of component or elementary streams. For example, the device may select a constant PID value or range of constant PID values for video component streams (e.g., 0x1FEE or other PID value), audio component streams (e.g., 0x1FED, range of 0x1FEC through 0x1FE1, or other PID value or range), ECM component streams (e.g., 0x1FE0), data component streams (e.g., range of 0x1F0E through 0xIFDE, or other PID value or range), and/or other PID types.

The access device 110 or STB 115 may select a constant PID value or range of constant PID values for video component streams, audio component streams, ECM component streams, data component streams, and/or other PID types. The PID value or range selection may be carried out such that the selected PID(s) do not fall within a range of well-known or reserved PID values (e.g., do not overlap PID values of program association table (PAT), PMT etc.). The selection may be carried out such that audio and video and similar components are grouped together for easy selection and ordering. As an example, video PIDs may be selected to cover a set of PIDs with increasing numbers and audio PIDs may be assigned in alphabetical order (e.g., English PID—0x1000, French PID—0x1001, German PID—0x1002, Spanish PID—0x1003, etc.).

In embodiments, an access device 110 or STB 115 may map PIDs of a received transport stream to a corresponding constant PID value. The device may parse component streams from a received content stream, identify a component type or classification (e.g., video, audio, ECM, data, etc.) associated with each component stream, and replace the PID of each respective component stream with a constant PID value that corresponds with the component type associated with the respective component stream. For example, the device may replace a PID of a video component stream with a constant PID value associated with video component streams, a PID of an audio component stream with a constant PID value associated with audio component streams, a PID of an ECM component stream with a constant PID value associated with ECM component streams, and a PID of a data component stream with a constant PID value associated with data component streams.

In embodiments, an access device 110 or STB 115 may configure one or more video and audio processors with the constant PID values selected for each type of component stream. The device may output the entirety of a piece of content, or multiple pieces of content, wherein the PIDs associated with the content have been modified such that all PIDs of a common component stream type are of the same value or are within a certain range of PID values designated for the component stream type. Thus, the content output from the device will include constant PID values for each component stream. For example, stitched content may include multiple content segments (e.g., targeted advertisement content stitched into a piece of multimedia) having different PID values for similar component streams. With the access device 110 or STB 115 configured to replace PIDs of similar component streams with a constant PID value, the stitched content output from the device will not include dissimilarities between PID values of similar types of component streams at the boundaries between the content segments making up the stitched content.

While recording a piece of content, outputting content for live viewing, or outputting a recorded piece of content for playback, the detection of a PID discontinuity may cause the recording or playback device to reacquire PMT information associated with the content. This reacquisition of PMT information can create a delay in channel tuning, a delay in the initiation of playback of a recording, and/or a loss of portions of stitched content at segment boundaries. By modifying content streams received at an access device 110 or STB 115 to include constant PID values, channel tuning, content playback, and content recording may be carried out without a PMT reacquisition being triggered by PID discontinuities caused by stitched content boundaries, initiation of content playback, or channel tuning.

After video and audio processors are configured with selected constant PID values for each component stream type, subsequent reconfigurations of the video and audio processors become unnecessary. Thus, subsequent channel tunes may be made without delay that would otherwise be caused by the reconfiguration of video and audio processors with updated PID values.

Upon a first playback of recorded content that has been recorded with constant PID values, video and audio processors may be directly configured without needing to acquire and build program association table (PAT) and PMT information because the primary stream component PIDs (i.e., the constant PID values) are already known. For example, the video and audio processors may be configured with the constant PID values as stored within the recorded content. Subsequent playbacks of the recorded content may be initiated without requiring a reconfiguration of the video and audio processors as the video and audio processors will already be configured with the constant PID values. Therefore, a first playback of recorded content may be initiated without a delay that would otherwise be caused by an acquisition and building of PAT and PMT information, and subsequent playbacks of recorded content may be initiated without a delay that would otherwise be caused by a reconfiguration of video and audio processors with updated PID values.

Upon a first streaming of content having PIDs of constant values from an access device 110 or STB 115 to a client device 105, the client device 105 may acquire PMT information including PID values associated with the received content and may configure video and audio processors with the retrieved PID values. During subsequent playbacks of the content and/or during transitions across segments of stitched content, the client device 105 will not require a reconfiguration of video and audio processors as the PID values of the content streamed from the access device 110 or STB 115 will be constant. Therefore, playback of the streamed content may be initiated and transitions between content segments may be made without delay that would otherwise be caused by a reconfiguration of video and audio processors with updated PID values.

Figure 2:
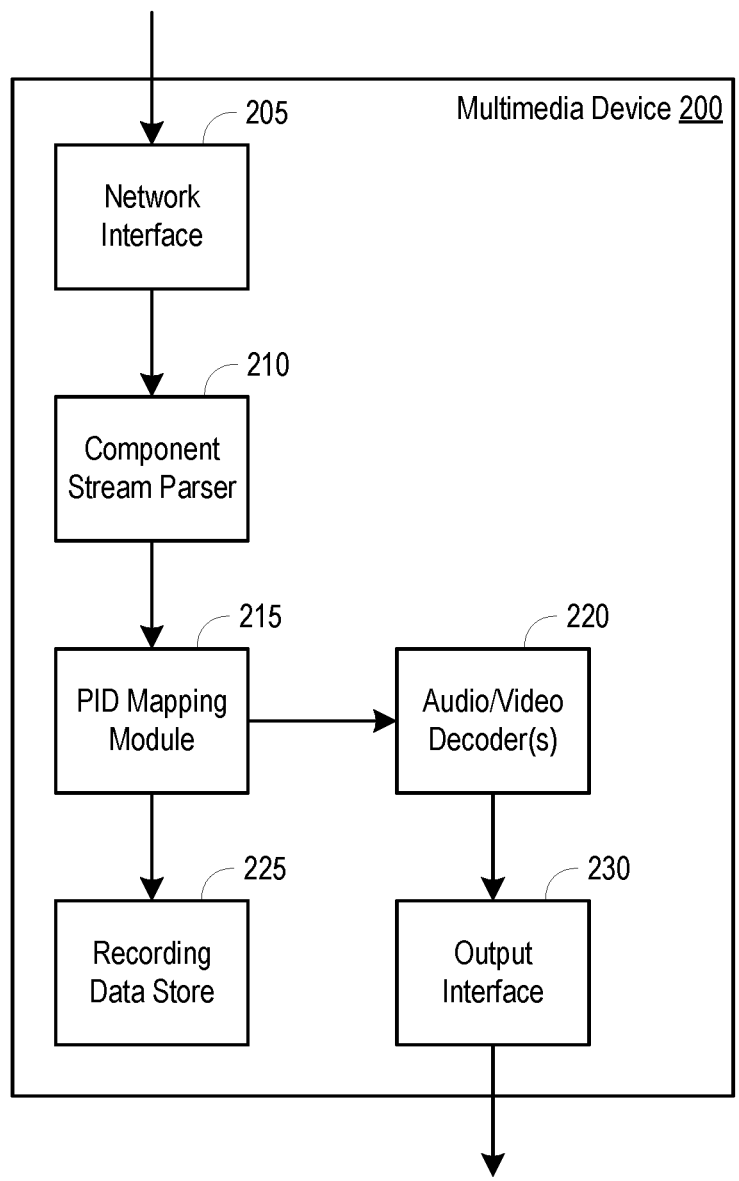
FIG. 2 is a block diagram illustrating an example multimedia device operable to facilitate the mapping of packet identifiers to a constant value.

FIG. 2 is a block diagram illustrating an example multimedia device 200 operable to facilitate the mapping of packet identifiers to a constant value. The multimedia device 200 may include a network interface 205, a component stream parser 210, a PID mapping module 215, one or more audio/video decoders 220, a recording data store 225, and an output interface 230. The multimedia device 200 may include an access device 110 of FIG. 1, a STB 115 of FIG. 1, or any other device configured to receive multimedia content. In embodiments, the multimedia device 200 may receive content carried by a transport stream. The transport stream may include one or more component streams (e.g., audio stream, video stream, ECM stream, data stream, etc.) and each respective one of the one or more component streams may be associated with a PID.

In embodiments, the multimedia device 200 may receive a transport stream over a channel (e.g., broadcast or linear channel, high-speed data channel, VoD channel, etc.). When the multimedia device 200 is tuned to a certain channel, the multimedia device 200 can identify and decode certain information within the transport stream, the certain information being associated with a piece of content that is of interest to a viewer.

In embodiments, a network interface 205 may receive a signal from an upstream network or network element. The network interface 205 may include a demodulator that may demodulate a received signal and may identify individual packets and/or streams that are to be decoded and output based upon PMT information recovered from the received signal. A PMT (e.g., PMT of a Moving Picture Experts Group (MPEG) transport stream) may include information associated with a channel or program such as audio PIDs, video PIDs, program clock reference (PCR) PIDs, ECM PIDs, data PIDs, metadata associated with the channel or program, and other information. The network interface 205 may identify one or more PIDs associated with component streams of content of interest.

In embodiments, a component stream parser 210 may parse component streams associated with content of interest from the transport stream. The component stream parser 210 may identify component streams for parsing based on PIDs of the component streams. For example, using retrieved PMT information, the component stream parser 210 may identify and parse one or more component streams (e.g., video stream, audio stream, ECM stream, data stream, etc.) based upon an identification of PIDs associated with the content of interest.

In embodiments, a PID mapping module 215 may determine a range of PID values from which to select a PID value for use as a constant PID value. The PID mapping module 215 may determine a range of PID values that does not overlap with PIDs used for the delivery of content to the multimedia device 200. For example, the PID mapping module 215 may determine a range of PID values that does not overlap with PIDs used by a headend device (e.g., modulator, multiplexer, edge QAM (quadrature amplitude modulation) device, and any other headend device that may form and/or manipulate a PMT) for various PIDs including PMT, entitlement control message (ECM), and component PIDs (e.g., video, audio, data, etc.). The PID mapping module 215 may select a constant PID value or a range of constant PID values for each of one or more types of component or elementary streams. It should be understood that, in some embodiments, the PID mapping module 215 may reside within an upstream headend device (e.g., modulator, multiplexer, edge QAM (quadrature amplitude modulation) device, and any other headend device that may form and/or manipulate a PMT).

In embodiments, the PID mapping module 215 may map PIDs of parsed component streams to a corresponding constant PID value. For example, the PID mapping module 215 may identify a component type associated with each component stream, and replace the PID of each respective component stream with a constant PID value that corresponds with the component type associated with the respective component stream. For example, the PID mapping module 215 may replace a PID of a video component stream with a constant PID value associated with video component streams, a PID of an audio component stream with a constant PID value associated with audio component streams, a PID of an ECM component stream with a constant PID value associated with ECM component streams, and a PID of a data component stream with a constant PID value associated with data component streams.

In embodiments, the PID mapping module 215 may configure one or more audio/video decoders 220 with the constant PID values selected for each type of component stream. The audio/video decoders 220 may identify, filter, and decode component streams having PIDs that match a designated constant PID value. The decoded component streams having constant PID values may be output from the multimedia device 200 to a display device through the output interface 230 or may be streamed to a device (e.g., client device 105 of FIG. 1) through the output interface 230.

In embodiments, modified component streams associated with content of interest may be recorded and stored at a recording data store 225, wherein each respective modified component stream includes a constant PID value.

Figure 3:
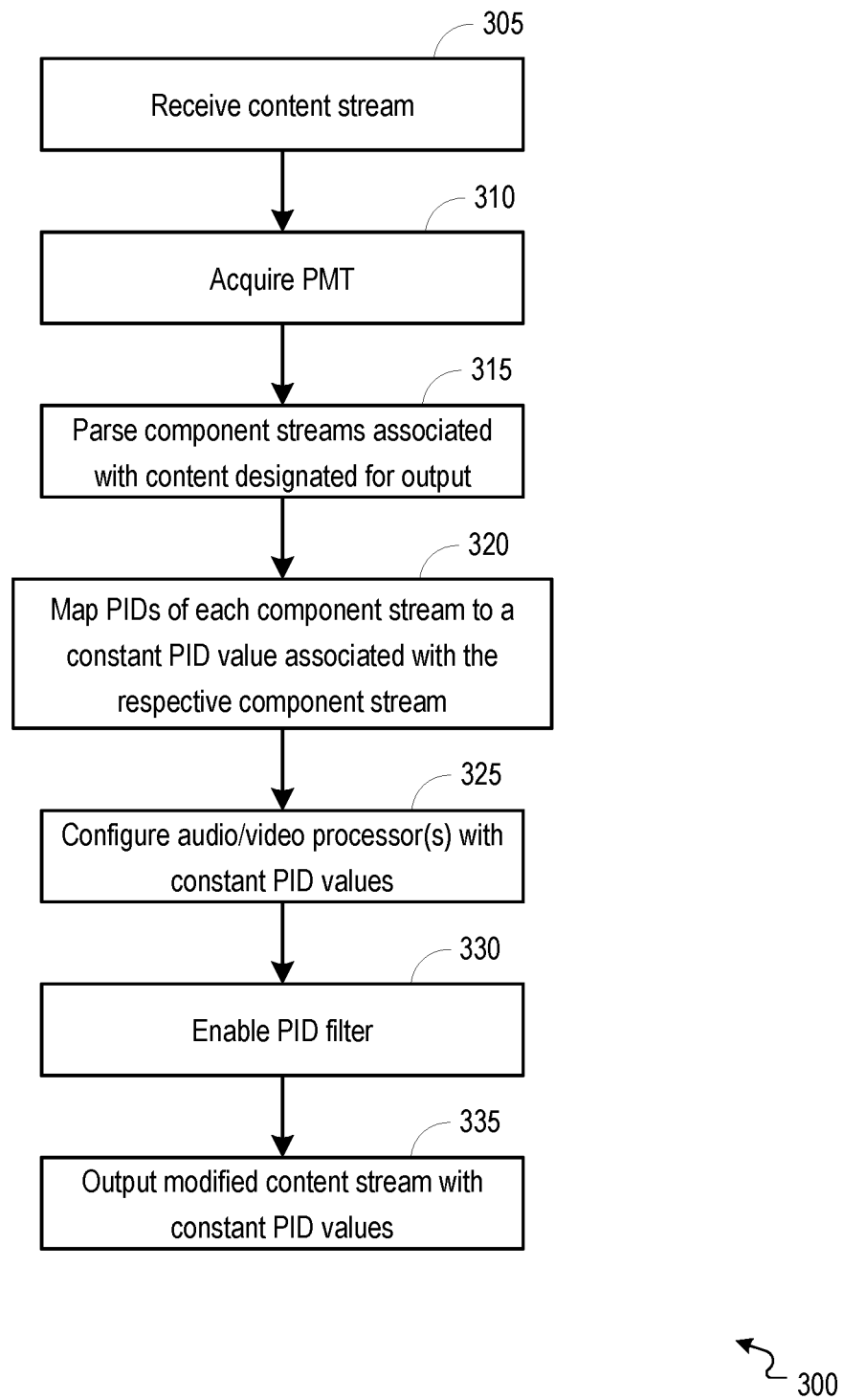
FIG. 3 is a flowchart illustrating an example process operable to facilitate the mapping of packet identifiers to a constant value.

FIG. 3 is a flowchart illustrating an example process 300 operable to facilitate the mapping of packet identifiers to a constant value. The process 300 can begin at 305, when a content stream is received at a multimedia device. In embodiments, the content stream may be received at a multimedia device as one or more component streams carried by a transport stream, wherein each respective component stream is associated with a PID value. The multimedia device may include an access device 110 of FIG. 1, a STB 115 of FIG. 1, or any other device configured to receive multimedia content.

At 310, a PMT may be acquired from the transport stream. The PMT may be acquired, for example, by a network interface 205 of FIG. 2. In embodiments, the multimedia device may retrieve information from the PMT for use in parsing and decoding specific content carried by the transport stream. For example, the multimedia device may determine PID values of component streams associated with content designated for output to a recording device or to a viewer.

At 315, component streams associated with content designated for output may be parsed from the transport stream. Component streams may be parsed from the transport stream, for example, by a component stream parser 210 of FIG. 2. In embodiments, the multimedia device may identify component streams for parsing from a received transport stream based upon the determination of PIDs associated with specific content. The multimedia device may identify PIDs associated with the specific content and may parse component streams associated with the identified PIDs from the transport stream. For example, filtering of component PIDs from the transport stream may be accomplished based on an identification of the PIDs from a PMT associated with the transport stream.

At 320, PIDs associated with the parsed component streams may be mapped to a constant PID value. PIDs may be mapped to a constant PID value, for example, by a PID mapping module 215 of FIG. 2. In embodiments, the multimedia device may be configured with a constant PID value or a range of constant PID values designated for each of one or more component stream types (e.g., video, audio, ECM, data, etc.). The multimedia device may replace each PID of each respective component stream with a constant PID value that is designated for the respective component stream. The PID mapping module 215 of FIG. 2 may modify PIDs within the transport stream to match the one or more identified constant PID values.

In embodiments, the multimedia device (e.g., an access device 110 of FIG. 1 or STB 115 of FIG. 1) may select a constant PID value or a range of constant PID values for each of one or more types of component or elementary streams. For example, the multimedia device may select a constant PID value or range of constant PID values for video component streams (e.g., 0x1FEE or other PID value), audio component streams (e.g., 0x1FED, range of 0x1FEC through 0x1FE1, or other PID value or range), ECM component streams (e.g., 0x1FE0), data component streams (e.g., range of 0x1F0E through 0xIFDE, or other PID value or range), and/or other PID types.

The multimedia device may select a constant PID value or range of constant PID values for video component streams, audio component streams, ECM component streams, data component streams, and/or other PID types. The PID value or range selection may be carried out such that the selected PID(s) do not fall within a range of well-known or reserved PID values (e.g., do not overlap PID values of program association table (PAT), PMT etc.). The selection may be carried out such that audio and video and similar components are grouped together for easy selection and ordering. As an example, video PIDs may be selected to cover a set of PIDs with increasing numbers and audio PIDs may be assigned in alphabetical order (e.g., English PID—0x1000, French PID—0x1001, German PID—0x1002, Spanish PID—0x1003, etc.).

At 325, one or more audio and video processors may be configured with the constant PID values. One or more audio and video processors (e.g., audio/video decoders 220 of FIG. 2) may be configured with the constant PID values, for example, by a PID mapping module 215 of FIG. 2. In embodiments, the audio and video processors may be configured to process component streams having PIDs that match the constant PID values. A PID filter may be enabled at 330 to prevent component streams having PIDs that do not match a constant PID value from being processed by the multimedia device.

At 335, the modified content stream including component streams with constant PID values may be output. In embodiments, the modified content stream may be recorded and stored (e.g., at a recording data store 225 of FIG. 2), may be output for display at a display device (e.g., through an output interface 230 of FIG. 2), or may be streamed to a device (e.g., streamed to a client device 105 of FIG. 1 via an output interface 230 of FIG. 2).

Figure 4:
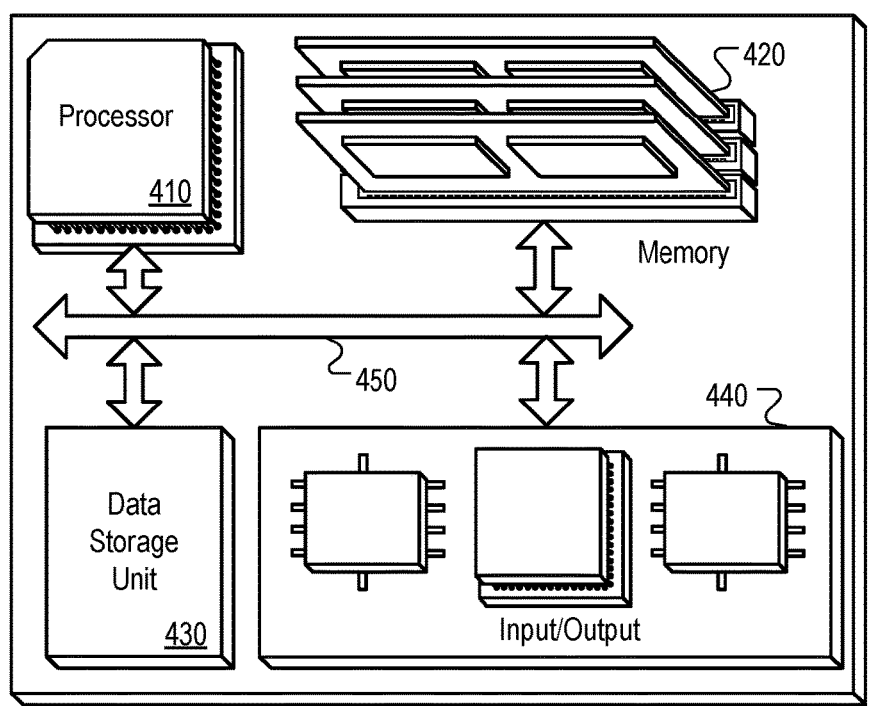
FIG. 4 is a block diagram of a hardware configuration operable to facilitate the mapping of packet identifiers to a constant value.

FIG. 4 is a block diagram of a hardware configuration 400 operable to facilitate the mapping of packet identifiers to a constant value. The hardware configuration 400 can include a processor 410, a memory 420, a storage device 430, and an input/output device 440. Each of the components 410, 420, 430, and 440 can, for example, be interconnected using a system bus 450. The processor 410 can be capable of processing instructions for execution within the hardware configuration 400. In one implementation, the processor 410 can be a single-threaded processor. In another implementation, the processor 410 can be a multi-threaded processor. The processor 410 can be capable of processing instructions stored in the memory 420 or on the storage device 430.

The memory 420 can store information within the hardware configuration 400. In one implementation, the memory 420 can be a computer-readable medium. In one implementation, the memory 420 can be a volatile memory unit. In another implementation, the memory 420 can be a non-volatile memory unit.

In some implementations, the storage device 430 can be capable of providing mass storage for the hardware configuration 400. In one implementation, the storage device 430 can be a computer-readable medium. In various different implementations, the storage device 430 can, for example, include a hard disk device, an optical disk device, flash memory or some other large capacity storage device. In other implementations, the storage device 430 can be a device external to the hardware configuration 400.

The input/output device 440 provides input/output operations for the hardware configuration 400. In one implementation, the input/output device 440 can include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 card), and/or one or more interfaces for outputting video and/or data services to a client device 105 of FIG. 1 (e.g., television, STB, computer, mobile device, tablet, etc.), an access device 110 of FIG. 1 (e.g., gateway device, wireless router, network extender, etc.), or STB 115 of FIG. 1. In embodiments, the input/output device can include driver devices configured to send communications to, and receive communications from one or more networks (e.g., WAN 120 of FIG. 1, provider network 125 of FIG. 1, local network, etc.).

Those skilled in the art will appreciate that the invention improves upon methods and systems for processing different content streams at a device. Methods, systems, and computer readable media can be operable to facilitate the mapping of packet identifiers to a constant value. A multimedia device may receive one or more pieces of multimedia content and may select a constant PID value for each of one or more component streams associated with the content. The multimedia device may map PIDs of each respective one of the one or more component streams to a constant PID value designated for the component type of the respective component stream. The multimedia device may replace the PIDs of each component stream with constant PID values such that each component stream type includes the same PID value for the entirety of the stream. The modified component streams, each having continuity with respect to PID values, may be stored as a recording or output to a device for viewing.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

We claim:

1. A method comprising:
   receiving a transport stream carrying one or more component streams associated with a piece of content, wherein each respective one of the one or more component streams comprises an original packet identifier;
   acquiring a program map table associated with the transport stream;
   using the program map table, identifying an original packet identifier of one or more of the component streams;
   parsing the one or more of the component streams from the transport stream;
   determining a constant packet identifier value for each respective one of one or more component stream types, wherein the constant packet identifier value is selected from one or more values that do not fall within a range of reserved packet identifier values;
   for each respective one of the one or more component streams, identifying a component stream type associated with the respective component stream;
   for each respective one of the one or more component streams, creating a modified component stream by replacing the original packet identifier with the constant packet identifier value determined for the component stream type associated with the respective component stream; and
   outputting the one or more modified component streams.

2. The method of claim 1, wherein one or more of the component streams associated with the piece of content comprises a plurality of segments, wherein the original packet identifiers of each of the plurality of segments are not the same.

3. The method of claim 1, further comprising:
   configuring one or more audio and video processors with the constant packet identifier values determined for each of the one or more component stream types.

4. The method of claim 1, wherein outputting the one or more modified component streams comprises outputting the one or more modified component streams to storage as a recording.

5. The method of claim 1, wherein outputting the one or more modified component streams comprises streaming the one or more modified component streams to a client device.

6. The method of claim 1, wherein outputting the one or more modified component streams comprises processing the one or more modified component streams for output to a display device.

7. The method of claim 1, wherein determining a constant packet identifier value for each respective one of one or more component stream types comprises selecting an unused value from a range of user ancillary packet identifier values.

8. An apparatus comprising:
an interface configured to be used to receive a transport stream carrying one or more component streams associated with a piece of content, wherein each respective one of the one or more component streams comprises an original packet identifier; and
one or more modules configured to:
acquire a program map table associated with the transport stream;
using the program map table, identify an original packet identifier of one or more of the component streams;
parse the one or more of the component streams from the transport stream;
determine a constant packet identifier value for each respective one of one or more component stream types, wherein the constant packet identifier value is selected from one or more values that do not fall within a range of reserved packet identifier values;
identify, for each respective one of the one or more component streams, a component stream type associated with the respective component stream;
create, for each respective one of the one or more component streams, a modified component stream by replacing the original packet identifier with the constant packet identifier value determined for the component stream type associated with the respective component stream; and
output the one or more modified component streams.

9. The apparatus of claim 8, wherein one or more of the component streams associated with the piece of content comprises a plurality of segments, wherein the original packet identifiers of each of the plurality of segments are not the same.

10. The apparatus of claim 8, wherein outputting the one or more modified component streams comprises outputting the one or more modified component streams to storage as a recording.

11. The apparatus of claim 8, wherein outputting the one or more modified component streams comprises streaming the one or more modified component streams to a client device.

12. The apparatus of claim 8, wherein outputting the one or more modified component streams comprises processing the one or more modified component streams for output to a display device.

13. The apparatus of claim 8, wherein determining a constant packet identifier value for each respective one of one or more component stream types comprises selecting an unused value from a range of user ancillary packet identifier values.

14. One or more non-transitory computer readable media having instructions operable to cause one or more processors to perform the operations comprising:
receiving a transport stream carrying one or more component streams associated with a piece of content, wherein each respective one of the one or more component streams comprises an original packet identifier;
acquiring a program map table associated with the transport stream;
using the program map table, identifying an original packet identifier of one or more of the component streams;
parsing the one or more of the component streams from the transport stream;
determining a constant packet identifier value for each respective one of one or more component stream types, wherein the constant packet identifier value is selected from one or more values that do not fall within a range of reserved packet identifier values;
for each respective one of the one or more component streams, identifying a component stream type associated with the respective component stream;
for each respective one of the one or more component streams, creating a modified component stream by replacing the original packet identifier with the constant packet identifier value determined for the component stream type associated with the respective component stream; and
outputting the one or more modified component streams.

15. The one or more non-transitory computer-readable media of claim 14, wherein one or more of the component streams associated with the piece of content comprises a plurality of segments, wherein the original packet identifiers of each of the plurality of segments are not the same.

16. The one or more non-transitory computer-readable media of claim 14, wherein the instructions are further operable to cause one or more processors to perform the operations comprising:
configuring one or more audio and video processors with the constant packet identifier values determined for each of the one or more component stream types.

17. The one or more non-transitory computer-readable media of claim 14, wherein outputting the one or more modified component streams comprises outputting the one or more modified component streams to storage as a recording.

18. The one or more non-transitory computer-readable media of claim 14, wherein outputting the one or more modified component streams comprises streaming the one or more modified component streams to a client device.

19. The one or more non-transitory computer-readable media of claim 14, wherein outputting the one or more modified component streams comprises processing the one or more modified component streams for output to a display device.

20. The one or more non-transitory computer-readable media of claim 14, wherein determining a constant packet identifier value for each respective one of one or more component stream types comprises selecting an unused value from a range of user ancillary packet identifier values.

* * * * *